United States Patent
Watanabe et al.

(10) Patent No.: US 9,205,817 B2
(45) Date of Patent: Dec. 8, 2015

(54) BRAKING FORCE CONTROL SYSTEM AND BRAKING FORCE CONTROL METHOD

(71) Applicants: Yoshinori Watanabe, Gotenba (JP); Satoshi Shimizu, Susono (JP)

(72) Inventors: Yoshinori Watanabe, Gotenba (JP); Satoshi Shimizu, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/366,456

(22) PCT Filed: Dec. 19, 2012

(86) PCT No.: PCT/IB2012/002742
§ 371 (c)(1),
(2) Date: Jun. 18, 2014

(87) PCT Pub. No.: WO2013/093594
PCT Pub. Date: Jun. 27, 2013

(65) Prior Publication Data
US 2014/0330501 A1    Nov. 6, 2014

(30) Foreign Application Priority Data
Dec. 22, 2011  (JP) ................................. 2011-281263

(51) Int. Cl.
*B60T 8/1764*  (2006.01)
*B60T 8/1755*  (2006.01)
*B60T 8/1766*  (2006.01)

(52) U.S. Cl.
CPC ............. *B60T 8/1764* (2013.01); *B60T 8/1755* (2013.01); *B60T 8/1766* (2013.01); *B60T 2201/16* (2013.01)

(58) Field of Classification Search
CPC ..... B60T 8/1755; B60T 8/1766; B60T 8/1764; B60T 2201/16
USPC ............ 701/90; 303/177, 138, 146–149, 186, 303/169, 159, 189
See application file for complete search history.

(56) References Cited

U.S. PATENT DOCUMENTS

| | | | |
|---|---|---|---|
| 5,388,896 A | 2/1995 | Hartmann et al. | |
| 6,375,280 B1 * | 4/2002 | Poggenburg et al. | 303/146 |
| 7,513,578 B2 * | 4/2009 | Nakaoka et al. | 303/169 |
| 7,661,772 B2 * | 2/2010 | Heinemann | 303/146 |
| 2001/0013723 A1 | 8/2001 | Takemasa et al. | |
| 2004/0128052 A1 | 7/2004 | Nihei et al. | |
| 2007/0029875 A1 | 2/2007 | Kurosaki et al. | |

FOREIGN PATENT DOCUMENTS

| | | |
|---|---|---|
| DE | 10 2008 027 093 A1 | 12/2009 |
| EP | 0 786 388 A2 | 7/1997 |

(Continued)

Primary Examiner — Marthe Marc-Coleman
(74) Attorney, Agent, or Firm — Oblon, McClelland, Maier & Neustadt, L.L.P.

(57) ABSTRACT

A braking device and a controller are provided. The braking device individually adjusts braking forces that are respectively generated at wheels of a vehicle. The controller executes braking force distribution control for individually controlling the braking forces at the right and left wheels of the vehicle such that slip conditions of the right and left wheels are equal to each other through control of the braking device. The controller executes the braking force distribution control on the basis of an upper limit of a right and left braking force deviation that is a deviation in braking force between the right and left wheels.

24 Claims, 7 Drawing Sheets

(56) References Cited

FOREIGN PATENT DOCUMENTS

| FR | 2 876 337 A1 | 4/2006 |
|---|---|---|
| JP | 03-246151 A | 11/1991 |
| JP | 05-319238 A | 12/1993 |
| JP | 06-156248 A | 6/1994 |
| JP | 10-138895 A | 5/1998 |
| JP | 2007-055583 A | 3/2007 |
| WO | WO 2011/024240 A1 | 3/2011 |

* cited by examiner

BRAKING FORCE CONTROL SYSTEM AND BRAKING FORCE CONTROL METHOD

BACKGROUND OF THE INVENTION

1. Field of the Invention

The invention relates to a braking force control system and a braking force control method.

2. Description of Related Art Japanese Patent Application Publication No. 10-138895 (JP 10-138895 A) describes a vehicle brake system as an existing braking force control system. The vehicle brake system independently controls braking forces of right and left rear wheels such that the distribution of brake force between front wheels and the rear wheels can be approximate to an ideal curve on the basis of a difference between a maximum front wheel speed and each rear wheel speed when a vehicle body speed is higher than or equal to a predetermined value and a vehicle body deceleration is higher than or equal to a predetermined value.

Incidentally, the above vehicle brake system described in JP 10-138895 A still has room for improvement in terms of, for example, stability of the behavior of a vehicle in the case where the tire characteristics (μ characteristics) of right and left wheels of the vehicle are different, the case where the vehicle is travelling on a so-called split μ road that is a travel road having different friction coefficients (road surface μ) of road surfaces with which the right and left wheels respectively contact, or the like.

SUMMARY OF THE INVENTION

The invention provides a braking force control system and a braking force control method that are able to stabilize the behavior of a vehicle.

An aspect of the invention provides a braking force control system. The braking force control system includes: a braking device that individually adjusts braking forces that are respectively generated at wheels of a vehicle; and a controller that executes braking force distribution control for individually controlling the braking forces at the right and left wheels such that slip conditions of the right and left wheels of the vehicle are equal to each other through control of the braking device, wherein the controller executes the braking force distribution control on the basis of an upper limit of a right and left braking force deviation that is a deviation in braking force between the right and left wheels.

In the braking force control system, in the braking force distribution control, when the right and left braking force deviation is larger than the upper limit, the controller may prohibit an increase in the braking force at an outer wheel side between the right and left wheels while an orientation of the vehicle is deflecting or while the vehicle is making a turn.

In the braking force control system, in the braking force distribution control, when the right and left braking force deviation is larger than the upper limit, at the time of reducing the braking force at an inner wheel side between the right and left wheels while an orientation of the vehicle is deflecting or while the vehicle is making a turn, the controller may also reduce the braking force at an outer wheel side as the braking force at the inner wheel side reduces.

In the braking force control system, the upper limit may increase as the absolute value of a deceleration of the vehicle increases.

In the braking force control system, the upper limit may increase as the absolute value of a deceleration of the vehicle reduces.

In the braking force control system, the upper limit may reduce as a travel speed of the vehicle increases.

In the braking force control system, the upper limit may increase as a lateral movement of the vehicle increases.

In the braking force control system, the upper limit may relatively reduce when one of the right and left wheels, having a larger braking force, is the wheel at a side toward which a lateral movement of the vehicle is directed, and may relatively increase when one of the right and left wheels, having a larger braking force, is the wheel at a side opposite to the side toward which the lateral movement of the vehicle is directed.

In the braking force control system, the upper limit may relatively increase when one of the right and left rear wheels, of the vehicle, having a larger braking force, is the wheel at a side at which one of the right and left front wheels of the vehicle, having a higher wheel speed, is located, and may relatively reduce when one of the right and left rear wheels of the vehicle, having a larger braking force, is the wheel at a side at which one of the right and left front wheels of the vehicle, having a lower wheel speed, is located.

Another aspect of the invention provides a braking force control method for a vehicle that includes a braking device that individually adjusts braking forces that are respectively generated at wheels of the vehicle. The braking force control method includes executing braking force distribution control for individually controlling the braking forces at the right and left wheels such that slip conditions of the right and left wheels of the vehicle are equal to each other through control of the braking device, wherein the braking force distribution control is executed on the basis of an upper limit of a right and left braking force deviation that is a deviation in braking force between the right and left wheels.

The braking force control system and the braking force control method according to the aspects of the invention are advantageously able to stabilize the behavior of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. Note that the invention is not limited by the embodiments. In addition, components in the embodiments described below include components that are easily replaceable by persons skilled in the art or substantially equivalent components.

First Embodiment

Figure 1:
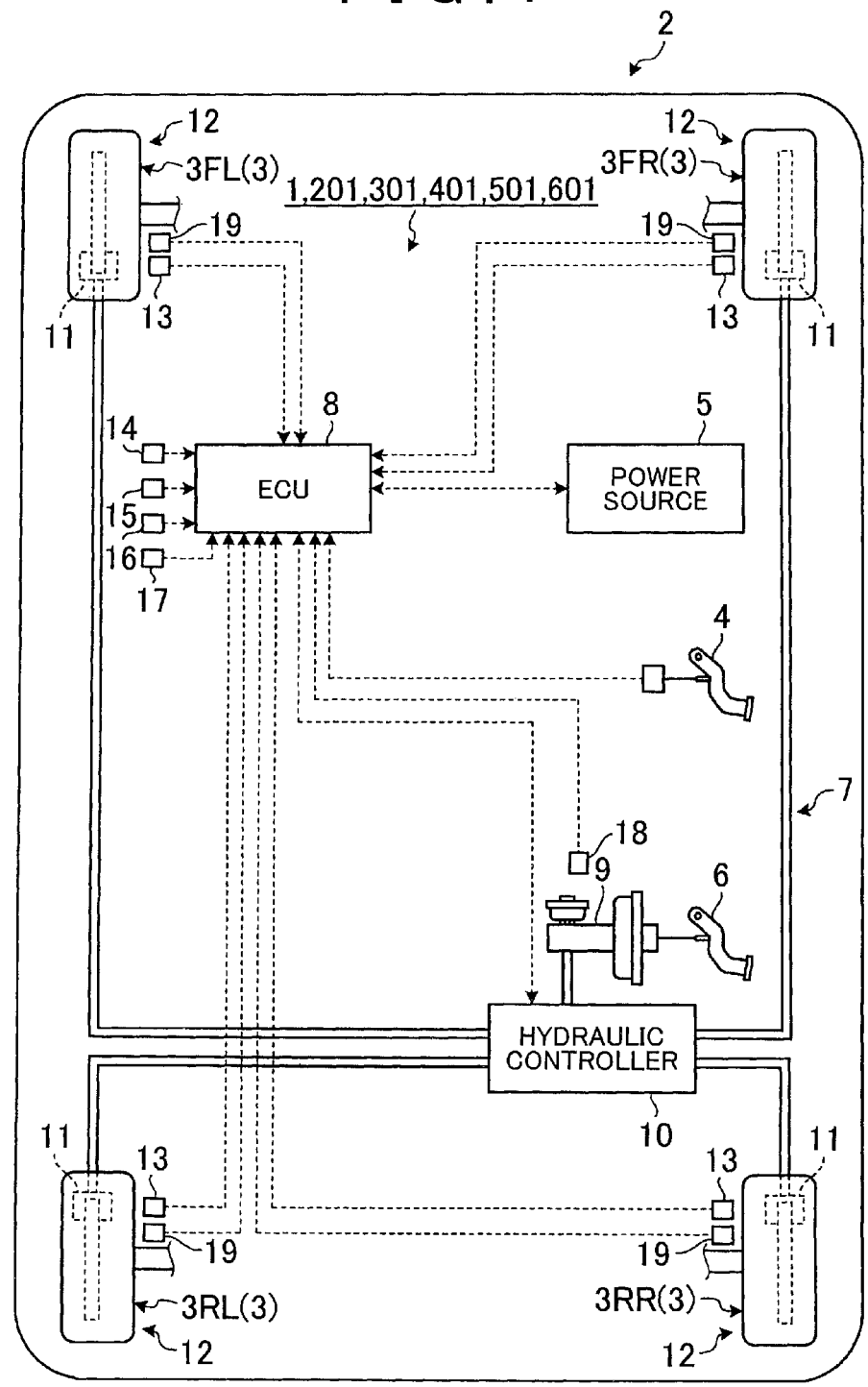
FIG. 1 is a schematic configuration view of a vehicle to which a braking force control system according to a first embodiment is applied.
Figure 2A:
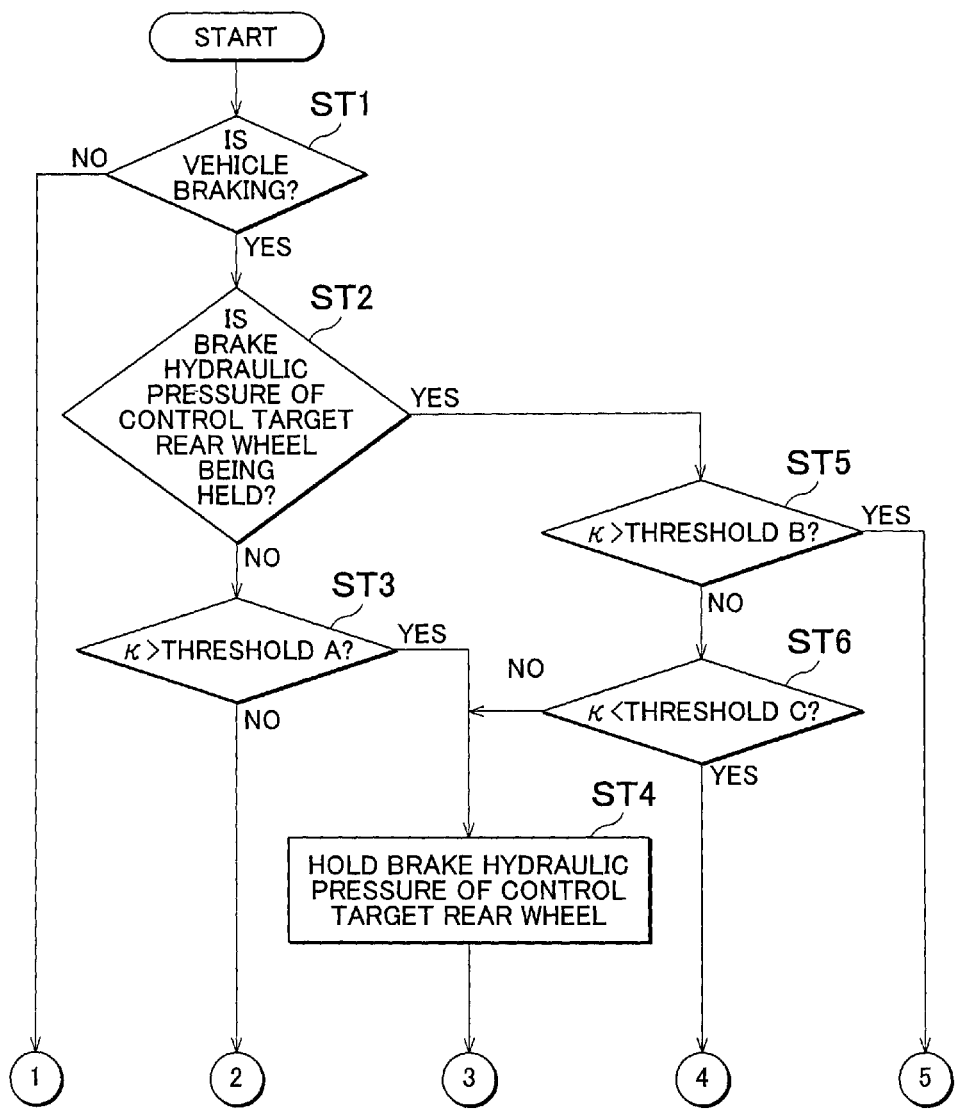
FIGS. 2A and 2B are a flowchart that illustrates an example of braking force distribution control that is executed by an ECU of the braking force control system according to the first embodiment.
Figure 2B:
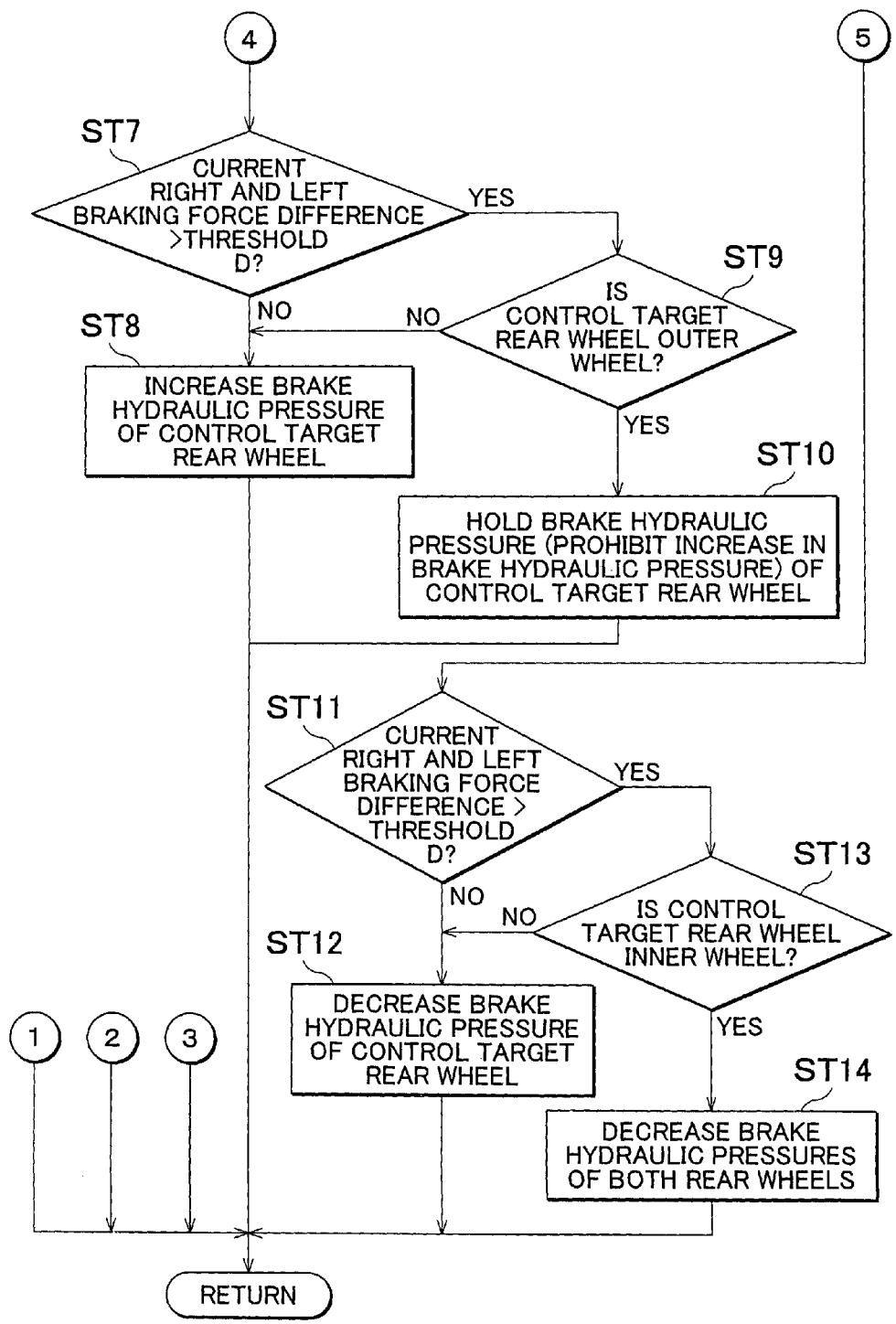

FIG. 1 is a schematic configuration view of a vehicle to which a braking force control system according to a first embodiment is applied. FIGS. 2A and 2B are a flowchart that illustrates an example of braking force distribution control that is executed by an ECU of the braking force control system according to the first embodiment.

As shown in FIG. 1, the braking force control system 1 according to the present embodiment is a braking force distribution system that is able to execute braking force distribution control. In the braking force distribution control, braking forces of wheels 3 are independently and individually controlled such that slip conditions (slip ratios) of the right and left wheels 3 of the vehicle 2, typically, the right and left rear wheels (hereinafter, referred to as "rear wheels" where appropriate) 3 of the vehicle 2, are equal to each other. The braking force control system 1 sets an allowable upper limit of a braking force difference (braking force deviation) between the right and left rear wheels 3 in the braking force distribution control. By so doing, the braking force control system 1 stabilizes the behavior of the vehicle 2 in the case where the tire characteristics (μ characteristics) of the right and left wheels 3 of the vehicle 2 are different, in the case where the vehicle 2 is travelling on a so-called split μ road that is a travel road having different friction coefficients (road surface of road surfaces with which the right and left wheels 3 respectively contact, or the like.

When the braking force difference is larger than the upper limit, the braking force control system 1 according to the present embodiment, at the time of a braking force increasing request for the outer wheels between the right and left wheels 3 while the orientation of the vehicle 2 is deflecting or while the vehicle 2 is making a turn, prohibits the braking force increasing request and does not output the braking force increasing request for the outer wheels or does not increase a braking force required value for the outer wheels. When the braking force difference is larger than the upper limit, the braking force control system 1, at the time of a braking force reducing request for the inner wheels between the right and left wheels 3 while the orientation of the vehicle 2 is deflecting or while the vehicle 2 is making a turn, simultaneously outputs the braking force reducing request to the right and left wheels 3, simultaneously reduces braking force required values for the inner and outer wheels and simultaneously reduces the braking forces at the right and left wheels 3.

As shown in FIG. 1, the braking force control system 1 according to the present embodiment is a braking control system that is mounted on the vehicle 2 and that is used to brake the vehicle 2. The braking force control system 1 is typically a system that stabilizes the behavior of the vehicle 2 by controlling the slip conditions of the wheels 3 through control over braking forces that are generated at the wheels 3 of the vehicle 2. The vehicle 2 includes the left front wheel (left front wheel 3) 3FL, the right front wheel (right front wheel 3) 3FR, the left rear wheel (left rear wheel 3) 3RL and the right rear wheel (right rear wheel 3) 3RR as the wheels 3. When it is not necessary to distinguish these wheels 3 from one another, these are simply referred to as wheels 3. Specifically, the braking force control system 1 includes an accelerator pedal 4, a power source 5, a brake pedal 6, a braking device 7, an ECU 8, and the like. The ECU 8 serves as a controller. The vehicle 2 generates driving force in the wheels 3 as follows. The power source 5 generates power (torque) in response to driver's operation of the accelerator pedal 4, and the power is transmitted to the wheels 3 via a power transmission device (not shown). The vehicle 2 generates braking forces in the respective wheels 3 as follows. The braking device 7 is activated in response to driver's operation of the brake pedal 6.

The power source 5 is a driving power source, such as an internal combustion engine and an electric motor. The braking device 7 is able to individually adjust the braking forces that are generated at the wheels 3 of the vehicle 2. The braking device 7 is one of various types of hydraulic brake devices in which a hydraulic passage that is connected from a master cylinder 9 to wheel cylinders 11 via a hydraulic controller (hydraulic actuator) 10 is filled with brake oil that is working fluid. In the braking device 7, hydraulic braking units 12 are activated on the basis of braking pressures that are supplied to the respective wheel cylinders 11, and, as a result, pressure braking forces are generated at the respective wheels 3. In the braking device 7, basically, as the driver operates the brake pedal 6, a master cylinder pressure (operating pressure) is applied to brake oil by the master cylinder 9 on the basis of a pedal depression force (operating force) that acts on the brake pedal 6. In the braking device 7, a pressure based on the master cylinder pressure is applied as a wheel cylinder pressure (braking pressure) in each wheel cylinder 11, and the corresponding hydraulic braking unit 12 is activated. In each hydraulic braking unit 12, the brake pads are brought into contact with and pressed against the disc rotor to cause predetermined rotational resistance force based on the wheel cylinder pressure to act on the disc rotor that rotates with the corresponding wheel 3 to thereby make it possible to apply braking force to the disc rotor and the wheel 3 that rotates integrally with the disc rotor. During then, in the braking device 7, the wheel cylinder pressure is appropriately regulated by the hydraulic controller 10 on the basis of a driving condition.

The hydraulic controller 10 individually adjusts the braking forces that are generated at the respective wheels 3 by individually increasing, decreasing or holding the wheel cylinder pressures independent of the four wheels. The hydraulic controller 10 is provided in a brake oil hydraulic passage that connects the master cylinder 9 to the wheel cylinders 11. The hydraulic controller 10 increases or decreases a liquid pressure in each wheel cylinder 11 through control executed the ECU 8, in addition to brake operation of the brake pedal 6, and controls braking forces that are applied to the respective wheels 3. The hydraulic controller 10 is, for example, configured to include a plurality of lines, an oil reservoir, an oil pump, hydraulic lines connected the wheel cylinders 11 respectively provided at the wheels 3, a plurality of electromagnetic valves for respectively increasing, decreasing or holding the hydraulic pressures in the hydraulic lines, and the like. The hydraulic controller 10 is controlled by the ECU 8. The hydraulic controller 10 functions as a working fluid pressure adjustment unit that holds, increases or decreases the hydraulic pressures (master cylinder pressure) in the hydraulic lines in accordance with control commands from the ECU 8 and then applies the hydraulic pressures to the respective wheel cylinders 11 (described later). During normal operation, the hydraulic controller 10 is able to regulate wheel cylinder pressures that are respectively applied to the wheel cylinders 11 in response to the driver's operation amount (depression amount) of the brake pedal 6 by, for example, driving the oil pump and the predetermined electromagnetic valves in accordance with a control command from the ECU 8. In addition, when braking force distribution control, or the like, is executed as will be described later, the hydraulic controller 10 is able to be activated in a pressure increasing mode; a pressure holding mode, a pressure decreasing mode, or the like, by, for example, driving the oil pump and the predetermined electromagnetic valves in accordance with a control command from the ECU 8. In the pressure increasing mode, the wheel cylinder pressures that are respectively applied to the wheel cylinders 11 are increased. In the pressure holding mode, the wheel cylinder pressures are kept substantially constant. In the pressure decreasing mode, the wheel cylinder pressures are decreased. The hydraulic controller 10 is able to set any one of the above modes independently for the wheel cylinders 11 of the wheels 3 on the basis of the driving condition of the vehicle 2 through control of the ECU 8. That is, the hydraulic controller 10 is able to individually adjust braking forces that are applied to the respective wheels 3 on the basis of the driving condition of the vehicle 2 irrespective of driver's operation of the brake pedal 6.

The ECU 8 executes drive control over various components of the vehicle 2. The ECU 8 is configured to include an electronic circuit. The electronic circuit is mainly formed of a known microcomputer that includes a CPU, a ROM, a RAM and an interface. Various sensors and detectors are attached to various portions of the vehicle 2, and include wheel speed sensors 13, a longitudinal acceleration sensor 14, a yaw rate sensor 15, a lateral acceleration sensor 16, a steering angle sensor 17, a master cylinder pressure sensor 18, wheel cylinder pressure sensors 19, and the like. Each of the wheel speed sensors 13 detects the rotation speed of a corresponding one of the wheels 3. The longitudinal acceleration sensor 14 detects the acceleration in the longitudinal direction (travelling direction), which arises in the body of the vehicle 2. The yaw rate sensor 15 detects the yaw rate of the vehicle 2. The lateral acceleration sensor 16 detects the acceleration in the lateral direction (direction that intersects with (that is perpendicular to) a travel direction), which arises in the body of the vehicle 2. The steering angle sensor 17 detects the steering angle of the vehicle 2. The master cylinder pressure sensor 18 detects the master cylinder pressure. The-wheel cylinder pressure sensors 19 respectively detect the wheel cylinder pressures of the corresponding wheels 3. These various sensors and detectors are, for example, electrically connected the ECU 8, and electrical signals corresponding to detected results are input to the ECU 8. The wheel cylinder pressures that are respectively detected by the corresponding wheel cylinder pressure sensors 19 are values based on the magnitudes of braking forces that are generated by the hydraulic braking units 12 of the corresponding wheels 3. The ECU 8 executes a stored control program on the basis of various input signals input from the various sensors and various maps to output driving signals to the various components of the vehicle 2, such as the power source 5 and the hydraulic controller 10 of the braking device 7, to thereby execute drive control over these components.

The ECU 8 according to the present embodiment controls the hydraulic controller 10 on the basis of the driving condition of the vehicle 2, and individually controls braking forces at the wheels 3 by individually increasing or decreasing the wheel cylinder pressures of the wheel cylinders 11 respectively provided for the wheels 3. By so doing, the ECU 8 is able to implement the braking force distribution function, and the like, of the vehicle 2. The ECU 8 is able to execute braking force distribution control, and the like, for individually controlling the slip conditions of the wheels 3 by controlling the braking device 7 as control for stabilizing the behavior of the vehicle 2. By so doing, the braking force control system 1 is able to control the behavior of the vehicle 2. As described above, the ECU 8 according to the present embodiment executes braking force distribution control for individually controlling the braking forces at the right and left wheels 3 such that the slip conditions of the right and left wheels 3 of the vehicle 2 are equal to each other through control of the braking device 7. In the braking force distribution control, the ECU 8 controls the slip conditions of the wheels 3, for example, the slip ratios of the wheels 3, by controlling the braking forces that are generated at the wheels 3 through adjustment of the wheel cylinder pressures (hereinafter, simply referred to as "brake hydraulic pressures" where appropriate) of the wheels 3. The slip ratio is an index that indicates a slip between the tire of each wheel 3 and a road surface. The ECU 8 typically controls the hydraulic controller 10 of the braking device 7 to individually control the brake hydraulic pressures of the right rear wheel 3RR and left rear wheel 3RL; which are the right and left rear wheels, independent of each other such that the slip ratios of the right rear wheel 3RR and left rear wheel 3RL are equal to each other.

In the braking force distribution control, the ECU 8 basically individually controls the brake hydraulic pressures of the right rear wheel 3RR and left rear wheel 3RL such that the slip ratios of the right rear wheel 3RR and left rear wheel 3RL respectively become target slip ratios in the braking force distribution control. By so doing, the ECU 8 controls the distribution of braking forces among the wheels 3, and controls the braking forces that are generated at the right rear wheel 3RR and the left rear wheel 3RL. The ECU 8 reduces the braking force by decreasing the brake hydraulic pressure when an actual slip ratio is larger than the target slip ratio in each of the right rear wheel 3RR and the left rear wheel 3RL; whereas the ECU 8 increases the braking force by increasing the brake hydraulic pressure when an actual slip ratio is lower than the target slip ratio in each of the right rear wheel 3RR and the left rear wheel 3RL. The ECU 8 executes control such that the slip ratios of the right rear wheel 3RR and left rear wheel 3RL are equal to each other by periodically repeating the control. By so doing, it is possible to improve the stability of the vehicle 2.

Note that the target slip ratio is, for example, set on the basis of a slip ratio equal to an actual slip ratio of each of the right front wheel 3FR and left front wheel 3FL at the time when the braking device 7 generates braking forces at the wheels 3 in response to driver's operation of the brake pedal 6. The target slip ratio may have a predetermined range. The ECU 8 may obtain the slip ratio of each wheel 3 using various known methods. For example, the ECU 8 may obtain the slip ratio of each wheel 3 on the basis of the wheel speed of the wheel 3 and the vehicle speed that is the travel speed of the vehicle 2. For example, the ECU 8 obtains a slip ratio κ using the following mathematical expression (1) on the basis of a wheel speed Vw of each wheel 3, detected by the corresponding wheel speed sensor 13, and a vehicle speed Vr of the vehicle 2, which is estimated from the wheel speed Vw of each wheel 3. The slip ratio κ is computed in correspondence with each wheel 3 on the basis of the detected value of the corresponding wheel speed sensor 13. The vehicle speed may be detected by a vehicle speed sensor provided separately from the wheel speed sensors 13.

$$\kappa = (Vr - Vw)/Vr \quad (1)$$

Note that, in this case, as described above, setting the slip ratios of the right rear wheel 3RR and left rear wheel 3RL through braking force distribution control such that the slip ratios of the right rear wheel 3RR and left rear wheel 3RL are equal to the slip ratios of the right front wheel 3FR and left front wheel 3FL corresponds to setting the wheel speeds of the right rear wheel 3RR and left rear wheel 3RL such that the wheel speeds of the right rear wheel 3RR and left rear wheel 3RL are equal to the wheel speeds of the right front wheel 3FR and left front wheel 3FL.

When the ECU 8 according to the present embodiment executes braking force distribution control, the ECU 8 executes braking force distribution control on the basis of an upper limit of a right and left braking force difference (right and left braking force deviation) that is a difference (deviation) in braking force between the right rear wheel 3RR and the left rear wheel 3RL. An upper limit that is set for a right and left braking force difference between the right rear wheel 3RR and the left rear wheel 3RL is set in advance on the basis of an allowable braking force difference. The upper limit is set in advance on the basis of the slip conditions of the wheels 3, the behavioral stability of the vehicle 2, and the like, through actual vehicle evaluation, or the like, and is stored in a storage unit of the ECU 8. By so doing, the braking force control system 1 is able to stabilize the behavior of the vehicle 2 even when, for example, the tire characteristics of the right and left wheels 3 of the vehicle 2 are different or even when the vehicle 2 is travelling on a split μ road.

For example, instability of the behavior of the vehicle 2 may occur when tires having different tire characteristics are respectively mounted at the right wheels 3 and the left wheels 3 or when the vehicle 2 brakes on a split μ road having different friction coefficients of road surfaces with which the right and left wheels 3 respectively contact. That is, when the tire characteristics of the right and left wheels 3 or the friction coefficients of road surfaces with which the right and left wheels 3 respectively contact are different the vehicle 2 may not be able to obtain proper braking force distribution even when the braking force distribution control is executed such that the slip ratios of the right rear wheel 3RR and left rear wheel 3RL are equal to each other. By so doing, the vehicle 2 may cause a deflection of the orientation of the vehicle body due to an unintended braking force difference. For example, it is assumed that a tire having a high grip (tire having a high μ characteristic) is mounted at the left rear wheel 3RL and a tire having a low grip (tire having a low μ characteristic) is mounted at the right rear wheel 3RR. In this case, the orientation of the body of the vehicle 2 tends to deflect or the vehicle 2 tends to make a left turn at the time of braking due to a difference in grip between the right rear wheel 3RR and the left rear wheel 3RL. A proper braking force distribution at this time satisfies the relationship [braking force of the right rear wheel 3RR]>[braking force of the left rear wheel 3RL]. However, in such a case, when the braking forces of the right rear wheel 3RR and left rear wheel 3RL are adjusted such that the slip ratios of the right rear wheel 3RR and left rear wheel 3RL are equal to each other through the above braking force distribution control, an actual braking force distribution may be set to the relationship [braking force of the right rear wheel 3RR]<[braking force of the left rear wheel 3RL]. As a result, the braking force distribution control is executed in a state where the orientation of the body of the vehicle 2 tends to deflect or the vehicle 2 tends to make a left turn at the time of braking due to a difference in grip between the right rear wheel 3RR and the left rear wheel 3RL, so the braking force distribution may be set such that the orientation of the body of the vehicle 2 tends to further deflect or the vehicle 2 tends to further make a left turn.

In contrast to this, as described above, the ECU 8 executes braking force distribution control on the basis of the upper limit of the right and left braking force difference between the right rear wheel 3RR and the left rear wheel 3RL. In the braking force distribution control, when the right and left braking force difference between the right rear wheel 3RR and the left rear-wheel 3RL is larger than the upper limit, the ECU 8 prohibits an increase in the braking force at the outer wheel (the braking force of the right rear wheel 3RR in the above example), which is one of the right rear wheel 3RR and the left rear wheel 3RL, while the orientation of the vehicle 2 is deflecting or while the vehicle 2 is making a turn, and does not increase the braking force of the outer wheel. In this case, at the time of a braking force increasing request for the outer wheel between the right rear wheel 3RR and the left rear wheel 3RL, the ECU 8 prohibits the braking force increasing request, and does not output the braking force increasing request for the outer wheel or does not increase the braking force required value for the outer wheel. Note that the deflection and turning direction of the vehicle 2 are determined on the basis of, for example, the right and left braking force difference, the tire characteristics of the right and left wheels 3 and the friction coefficients of road surfaces with which the right and left wheels 3 respectively contact, and, accordingly, the inner wheel and the outer wheel are determined.

In the braking force distribution control, when the right and left braking force difference between the right rear wheel 3RR and the left rear wheel 3RL is larger than the upper limit, at the time of reducing the braking force of the inner wheel, which is one of the right rear wheel 3RR and the left rear wheel 3RL, while the orientation of the vehicle 2 is deflecting or while the vehicle 2 is making a turn, the ECU 8 also reduces the braking force at the outer wheel as the braking force at the inner wheel reduces. In this case, the ECU 8 simultaneously outputs a braking force reducing request to the right rear wheel 3RR and the left rear wheel 3RL at the time of the braking force reducing request for the inner wheel that is one of the right rear wheel 3RR and the left rear wheel 3RL, simultaneously reduces the braking force required values for the inner and outer wheels, and simultaneously reduces the braking forces at the right rear wheel 3RR and the left rear wheel 3RL.

The thus configured braking force control system 1 executes braking force distribution control on the basis of the upper limit of the right and left braking force difference between the right rear wheel 3RR and the left rear wheel 3RL, and, for example, in a state where the right and left braking force difference between the right rear wheel 3RR and the left rear wheel 3RL has reached the upper limit, does not increase the braking force at the outer wheel. Thus, in the braking force distribution control, when the braking force control system 1 individually adjusts the braking forces at the right rear wheel 3RR and the left rear wheel 3RL in order to equalize the slip ratios of the right rear wheel 3RR and left rear wheel 3RL, the braking force control system 1 is able to prevent a situation that the right and left braking force difference is larger than or equal to the allowable upper limit. By so doing, the braking force control system 1 is able to set the proper distribution of right and left braking forces, and is able to suppress occurrence of orientation deflection and turn of the vehicle 2 due to an unintended right and left braking force difference. As a result, the braking force control system 1 is able to minimize instability of the behavior of the vehicle 2 even when, for example, the tire characteristics of the right and left wheels 3 of the vehicle 2 are different or the vehicle 2 is travelling on a split μ road.

When it is required to decrease the brake hydraulic pressure of the inner wheel (regulate the pressure such that the right and left braking force difference increases) in a state where the right and left braking force difference between the right rear wheel 3RR and the left rear wheel 3RL has reached the upper limit, the braking force control system 1 simultaneously decreases the brake hydraulic pressures of the inner and outer wheels, and simultaneously reduces the braking forces at the right rear wheel 3RR and the left rear wheel 3RL. By so doing, the braking force control system 1 is able to set proper slip ratios for the right rear wheel 3RR and the left rear wheel 3RL while bringing the right and left braking force difference within an allowable range, that is, the range of the upper limit, and is able to reliably ensure the directional stability, and the like, of the vehicle 2 by preventing locking, or the like, of the right rear wheel 3RR and left rear wheel 3RL.

Next, an example of braking force distribution control that is executed by the ECU 8 will be described with reference to the flowchart of FIGS. 2A and 2B. Note that the control routine is repeatedly executed at control intervals of several milliseconds to several tens of milliseconds. The braking force distribution control according to the present embodiment is individually executed for each of the right rear wheel 3RR and the left rear wheel 3RL. In the following description, between the right rear wheel 3RR and the left rear wheel 3RL, the wheel 3 that is subjected to braking force distribution control is termed control target rear wheel.

The ECU 8 determines whether the vehicle 2 is currently braking on the basis of the results detected by the wheel cylinder pressure sensors 19 (ST1). When the ECU 8 determines that the vehicle 2 is not currently braking (No in ST1), the ECU 8 ends the current control cycle, and proceeds with the process to the next control cycle.

When the ECU 8 determines that the vehicle 2 is currently braking (Yes in ST1), the ECU 8 determines whether the brake hydraulic pressure of the control target rear wheel is being held on the basis of the result detected by the corresponding wheel cylinder pressure sensor 19, and the like (ST2).

When the ECU 8 determines that the brake hydraulic pressure of the control target rear wheel is not being held (No in ST2), the ECU 8 determines whether the slip ratio κ of the control target rear wheel is larger than a threshold A on the basis of the result detected by the corresponding wheel speed sensor 13, and the like (ST3). The threshold A is, for example, set on the basis of the above-described target slip ratio.

When the ECU 8 determines that the slip ratio κ of the control target rear wheel is smaller than or equal to the threshold A (No in ST3), the ECU 8 ends the current control cycle, and proceeds with the process to the next control cycle. When the ECU 8 determines that the slip ratio κ of the control target rear wheel is larger than the threshold A (Yes in ST3), the ECU 8 controls the hydraulic controller 10 to hold the brake hydraulic pressure of the control target rear wheel to thereby hold the braking force at the control target rear wheel (ST4), ends the current control cycle, and proceeds with the process to the next control cycle.

When the ECU 8 determines in ST2 that the brake hydraulic pressure of the control target rear wheel is being held (Yes in ST2), the ECU 8 determines whether the slip ratio κ of the control target rear wheel is larger than a threshold B on the basis of the result detected by the corresponding wheel speed sensor 13 (ST5). The threshold B, as well as the above threshold A, is, for example, set on the basis of the above-described target slip ratio.

When the ECU 8 determines that the slip ratio κ of the control target rear wheel is smaller than or equal to the threshold B (No in ST5), the ECU 8 determines whether the slip ratio κ of the control target rear wheel is smaller than a threshold C on the basis of the result detected by the corresponding wheel speed sensor 13 (ST6). The threshold C, as well as the above thresholds A and B, is, for example, set on the basis of the above-described target slip ratio. Here, the threshold C is set in consideration of a predetermined hysteresis against the threshold B in order to suppress hunting of control. When the ECU 8 determines that the slip ratio κ of the control target rear wheel is larger than or equal to the threshold C (No in ST6), the ECU 8 proceeds with the process to ST4, and then controls the hydraulic controller 10 to hold the brake hydraulic pressure of the control target rear wheel.

When the ECU 8 determines that the slip ratio κ of the control target rear wheel is smaller than the threshold C (Yes in ST6), the ECU 8 determines whether the current right and left braking force difference between the right rear wheel 3RR and the left rear wheel 3RL is larger than a threshold D on the basis of the results detected by the corresponding wheel cylinder pressure sensors 19, and the like (ST7). The threshold D is set on the basis of the above-described upper limit.

When the ECU 8 determines that the current right and left braking force difference between the right rear wheel 3RR and the left rear wheel 3RL is smaller than or equal to the threshold D (No in ST7), the ECU 8 controls the hydraulic controller 10 such that the brake hydraulic pressure of the control target rear wheel is increased to thereby increase the braking force at the control target rear wheel (ST8), after which the ECU 8 ends the current control cycle and proceeds with the process to the next control cycle.

When the ECU 8 determines that the current right and left braking force difference between the right rear wheel 3RR and the left rear wheel 3RL is larger than the threshold D (Yes in ST7), the ECU 8 determines whether the control target rear wheel is the outer wheel (ST9).

When the control target rear wheel is not the outer wheel (No in ST9), the ECU 8 proceeds with the process to STB; and then controls the hydraulic controller 10 such that the brake hydraulic pressure of the control target rear wheel increases. When the control target rear wheel is the outer wheel (Yes in ST9), the ECU 8 prohibits an increase in the brake hydraulic pressure, and controls the hydraulic controller 10 such that the brake hydraulic pressure of the control target rear wheel is held to thereby hold the braking force at the control target rear wheel (ST10), after which the ECU 8 ends the current control cycle and proceeds with the process to the next control cycle.

When the ECU 8 determines in ST5 that the slip ratio κ of the control target rear wheel is larger than the threshold B (Yes in ST5), the ECU 8 determines whether the current right and left braking force difference between the right rear wheel 3RR and the left rear wheel 3RL is larger than the threshold D on the basis of the results detected by the corresponding wheel cylinder pressure sensors 19, and the like (ST11).

When the ECU 8 determines that the current right and left braking force difference between the right rear wheel 3RR and the left rear wheel 3RL is smaller than or equal to the threshold D (No in ST11), the ECU 8 controls the hydraulic controller 10 such that the brake hydraulic pressure of the control target rear wheel is decreased to thereby reduce the braking force at the control target rear wheel (ST12), after which the ECU 8 ends the current control cycle and proceeds with the process to the next control cycle.

When the ECU 8 determines that the current right and left braking force difference between the right rear wheel 3RR and the left rear wheel 3RL is larger than the threshold D (Yes in ST11), the ECU 8 determines whether the control target rear wheel is the inner wheel (ST13).

When the control target rear wheel is not the inner wheel (No in ST13), the ECU 8 proceeds with the process to ST12, and then controls the hydraulic controller 10 such that the brake hydraulic pressure of the control target rear wheel is decreased. When the control-target rear wheel is the inner wheel (Yes in ST13), the ECU 8 controls the hydraulic controller 10 such that the brake hydraulic pressures of both rear wheels (the right rear wheel 3RR and the left rear wheel 3RL) are decreased to thereby simultaneously reduce the braking forces at both rear wheels (ST14), after which the ECU 8 ends the current control cycle and proceeds with the process to the next control cycle.

The braking force control system 1 according to the above-described embodiment includes the braking device 7 and the ECU 8. The braking device 7 is able to individually adjust the braking forces that are respectively generated at the wheels 3 of the vehicle 2. The ECU 8 is able to execute braking force distribution control for individually controlling the braking forces at the right and left wheels 3 such that the slip conditions of the right and left wheels 3 of the vehicle 2 are equal to each other through control of the braking device 7. The ECU 8 executes braking force distribution control on the basis of the upper limit of the right and left braking force deviation that is a deviation in braking force between the right and left wheels 3. Thus, the braking force control system 1 is able to stabilize the behavior of the vehicle 2 through braking force distribution control even when the tire characteristics of the right and left wheels 3 of the vehicle 2 are different or even when the vehicle 2 is travelling on a split μ road.

Second Embodiment

Figure 3:
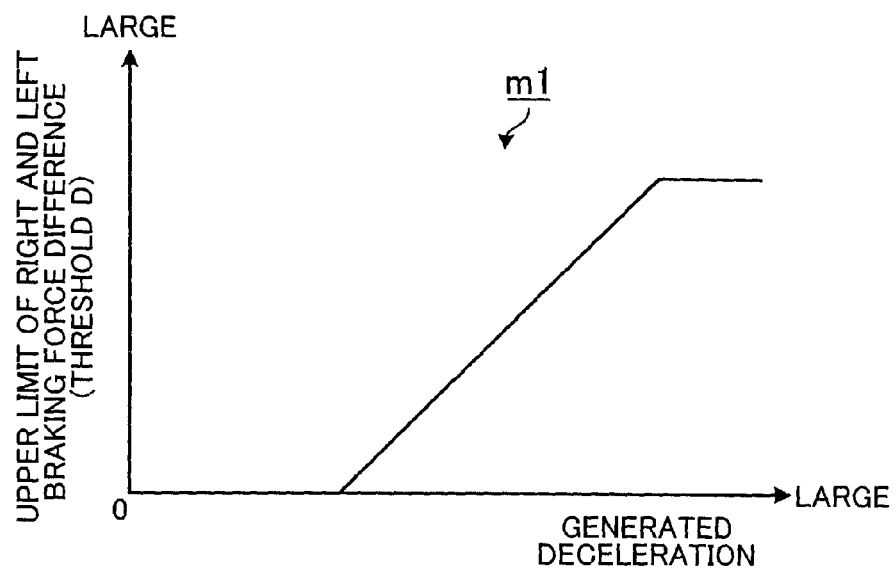
FIG. 3 is a graph that shows an example of an upper limit map of a braking force control system according to a second embodiment.
Figure 4:
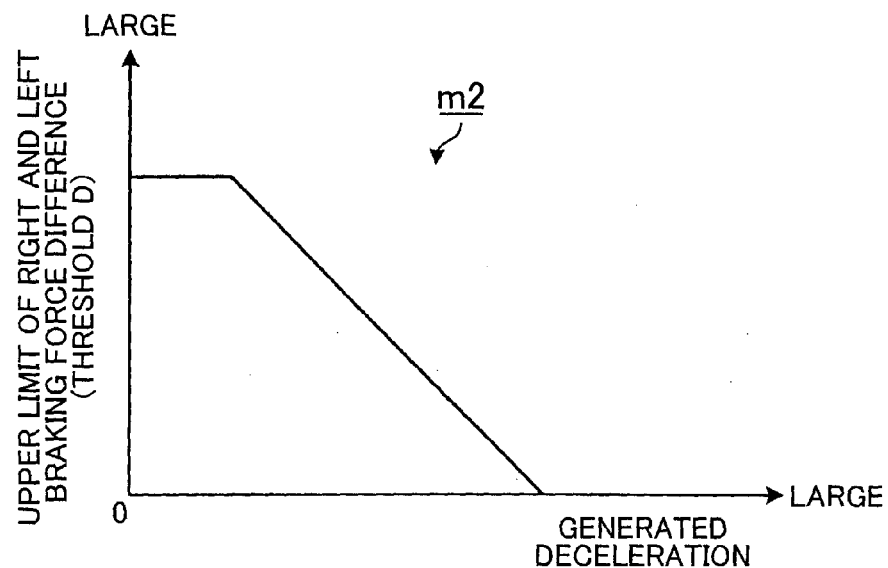
FIG. 4 is a graph that shows an example of an upper limit map of a braking force control system according to an alternative embodiment.

FIG. 3 is a graph that shows an example of an upper limit map of a braking force control system according to a second embodiment. FIG. 4 is a graph that shows an example of an upper limit map of a braking force control system according to an alternative embodiment. The braking force control system according to the second embodiment differs from that of the first embodiment in that the upper limit is changed on the basis of the absolute value of the deceleration of the vehicle. Other than that, the overlap description of components, operations and advantageous effects that are common to the above-described embodiment is omitted as much as possible. FIG. 1 is referenced for the details of the components of the braking force control system according to the second embodiment where appropriate (the same applies to the following embodiments).

The ECU 8 of the braking force control system 201 (see FIG. 1) according to the present embodiment changes the upper limit on the basis of the absolute value of the deceleration of the vehicle 2. In the present embodiment, the upper limit that is set for the right and left braking force difference between the right rear wheel 3RR and the left rear wheel 3RL is set so as to increase as the absolute value of the deceleration of the vehicle 2 increases.

Here, an upper limit map m1 shown in FIG. 3 is a map for setting the upper limit (threshold D), the abscissa axis represents a deceleration that is generated by the vehicle 2 (hereinafter, referred to as "generated deceleration" where appropriate), and the ordinate axis represents an upper limit that is set for the right and left braking force difference. The upper limit map m1 describes the correlation between a generated deceleration and an upper limit of the right and left braking force difference. The upper limit map m1 sets the correlation between a generated deceleration and an upper limit of the right and left braking force difference in advance through an actual vehicle evaluation, or the like, and is then stored in the storage unit of the ECU 8. In the upper limit map m1, the upper limit of the right and left braking force difference increases with an increase in the absolute value of the generated deceleration. The ECU 8 calculates the upper limit of the right and left braking force difference on the basis of the upper limit map m1 from the generated deceleration that is detected by the longitudinal acceleration sensor 14. By so doing, the ECU 8 is allowed to increase the upper limit of the right and left braking force difference as the absolute value of the deceleration of the vehicle 2 increases.

Note that, in the present embodiment, the ECU 8 calculates the upper limit of the right and left braking force difference using the upper limit map m1 shown in FIG. 3; however, the present embodiment is not limited to this configuration. The ECU 8 may, for example, calculate the upper limit of the right and left braking force difference on the basis of a mathematical expression model that corresponds to the upper limit of the right and left braking force difference, shown in FIG. 3. The same applies to various maps described below.

The vehicle 2 tends to have a relatively low generatable deceleration when the tire characteristics of the right and left wheels 3 are different or when the vehicle 2 is travelling on a split μ road. In addition, the vehicle 2 tends to have a larger right and left braking force difference that is required to directional stability as the generated deceleration increases.

In contrast to this, the above-configured braking force control system 201 sets the upper limit of the right and left braking force difference to a larger value as the absolute value of the generated deceleration increases. As a result, the braking force control system 201 is able to suppress the allowable right and left braking force difference in braking force distribution control in a driving range in which the generated deceleration is low, for example, when the tire characteristics of the right and left wheels 3 of the vehicle 2 are highly likely to be different or when the vehicle 2 is highly likely to be travelling on a split μ, road, and to allow a larger right and left braking force difference in braking force distribution control in a driving range in which a larger right and left braking force difference is required for directional stability. As a result, the braking force control system 201 is able to further reliably stabilize the behavior of the vehicle through braking force distribution control even when the tire characteristics of the right and left wheels 3 of the vehicle 2 are different or even when the vehicle 2 is travelling on a split μ road.

In the above description, the upper limit of the right and left braking force difference is set so as to increase as the absolute value of the deceleration of the vehicle 2 increases. Instead, the upper limit of the right and left braking force difference may be set so as to increase as the absolute value of the deceleration of the vehicle 2 reduces as shown by an upper limit map m2 in FIG. 4. In this case, the braking force control system 201 obtains advantageous effects different from the above.

More specifically, in the upper limit map m2 shown in FIG. 4, the upper limit of the right and left braking force difference reduces with an increase in the absolute value of the generated deceleration. The ECU 8 calculates the upper limit of the right and left braking force difference on the basis of the upper limit map m2 from the generated deceleration that is detected by the longitudinal acceleration sensor 14. By so doing, the ECU 8 is allowed to increase the upper limit of the right and left braking force difference as the absolute value of the deceleration of the vehicle 2 reduces.

In this case, the braking force control system 201 is able to suppress a change in the behavior of the vehicle 2 due to an unintended braking force difference to substantially the same level from a high-deceleration driving range in which the behavioral sensitivity of the vehicle 2 is relatively high to a low-deceleration driving range in which the behavioral sensitivity is relatively low. By so doing, it is possible to equalize a driving feeling.

Third Embodiment

Figure 5:
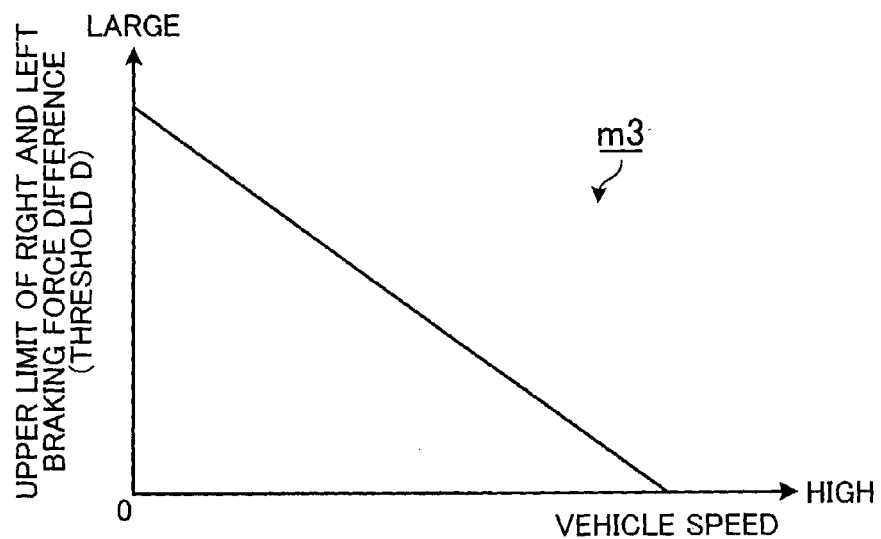
FIG. 5 is a graph that shows an example of an upper limit map of a braking force control system according to a third embodiment.

FIG. 5 is a graph that shows an example of an upper limit map of a braking force control system according to a third embodiment. The braking force control system according to the third embodiment differs from those of the first and second embodiments in that the upper limit is changed on the basis of the travel speed of the vehicle.

The ECU 8 of the braking force control system 301 (see FIG. 1) according to the present embodiment changes the upper limit on the basis of the vehicle speed that is the travel speed of the vehicle 2. In the present embodiment, the upper limit that is set for the right and left braking force difference between the right rear wheel 3RR and the left rear wheel 3RL is set so as to reduce as the vehicle speed of the vehicle 2 increases.

Here, an upper limit map m3 shown in FIG. 5 is a map for setting the upper limit (threshold D), the abscissa axis represents a vehicle speed of the vehicle 2, and the ordinate axis represents an upper limit that is set for the right and left braking force difference. The upper limit map m3 describes the correlation between a vehicle speed and an upper limit of the right and left braking force difference. The upper limit map m3 sets the correlation between a vehicle speed and an upper limit of the right and left braking force difference in advance through an actual vehicle evaluation, or the like, and is then stored in the storage unit of the ECU 8. In the upper limit map m3, the upper limit of the right and left braking force difference reduces with an increase in the vehicle speed. The ECU 8 calculates the upper limit of the right and left braking force difference on the basis of the upper limit map m3 from the vehicle speed that is estimated from the wheel speeds that are respectively detected by the wheel speed sensors 13. By so doing, the ECU 8 is allowed to reduce the upper limit of the right and left braking force difference as the vehicle speed of the vehicle 2 increases.

The behavior of the vehicle 2 caused by an unintended right and left braking force difference that occurs due to a difference in tire characteristic between the right and left wheels 3 or a travel on a split μ road tends to have a higher behavioral sensitivity against the right and left braking force difference as the vehicle speed relatively increases. Therefore, the behavior of the vehicle 2 tends to be larger as the vehicle speed relatively increases even with the equal right and left braking force difference.

In contrast to this, the above-configured braking force control system 301 sets the upper limit of the right and left braking force difference to a smaller value as the vehicle speed increases. As a result, the braking force control system 301 is able to suppress the allowable right and left braking force difference in braking force distribution control as the behavioral sensitivity of the vehicle 2 relatively increases, and is able to increase the allowable right and left braking force difference as the behavioral sensitivity of the vehicle 2 relatively decreases. Thus, the braking force control system 301 is able to suppress a change in the behavior of the vehicle 2 due to an unintended braking force difference to substantially the same level from a relatively high-speed driving range in which the behavioral sensitivity of the vehicle 2 is relatively high to a relatively low-speed driving range in which the behavioral sensitivity is relatively low. By so doing, it is possible to equalize a driving feeling.

Fourth Embodiment

Figure 6:
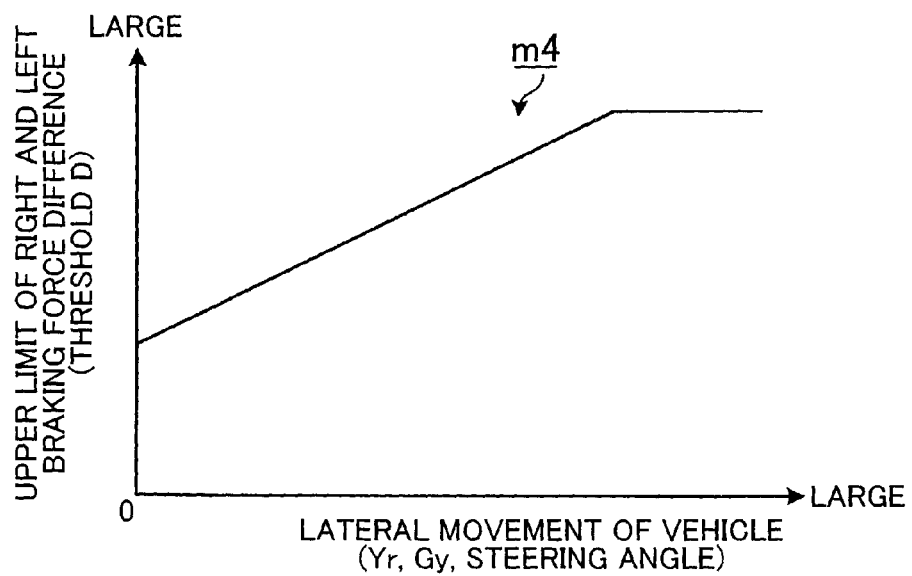
FIG. 6 is a graph that shows an example of an upper limit map of a braking force control system according to a fourth embodiment.

FIG. 6 is a graph that shows an example of an upper limit map of a braking force control system according to a fourth embodiment. The braking force control system according to the fourth embodiment differs from those of the first to third embodiments in that the upper limit is changed on the basis of the lateral movement of the vehicle.

The ECU 8 of the braking force control system 401 (see FIG. 1) according to the present embodiment changes the upper limit on the basis of the magnitude of the lateral movement of the vehicle 2. In the present embodiment, the upper limit that is set for the right and left braking force difference between the right rear wheel 3RR and the left rear wheel 3RL is set so as to increase as the lateral movement of the vehicle 2 increases. Here, an index that indicates the magnitude of the lateral movement of the vehicle 2 may be, for example, the yaw rate of the vehicle 2, which is detected by the yaw rate sensor 15, the lateral acceleration of the vehicle 2, which is detected by the lateral acceleration sensor 16, the steering angle of the vehicle 2, which is detected by the steering angle sensor 17, or the like.

Here, an upper limit map m4 shown in FIG. 6 is a map for setting the upper limit (threshold D), the abscissa axis represents an index (yaw rate Yr, lateral acceleration G or steering angle) that indicates the magnitude of the lateral movement of the vehicle 2, and the ordinate axis represents an upper limit that is set for the right and left braking force difference. The upper limit map m4 describes the correlation between an index that indicates the magnitude of the lateral movement and an upper limit of the right and left braking force difference. The upper limit map m4 sets the correlation between an index that indicates the magnitude of the lateral movement and an upper limit of the right and left braking force difference in advance through an actual vehicle evaluation, or the like, and is then stored in the storage unit of the ECU 8. In the upper limit map m4, the upper limit of the right and left braking force difference increases with an increase in the index that indicates the lateral movement. The ECU 8 calculates the upper limit of the right and left braking force difference on the basis of the upper limit map m4 from the yaw rate of the vehicle 2, which is detected by the yaw rate sensor 15, the lateral acceleration of the vehicle 2, which is detected by the lateral acceleration sensor 16, or the steering angle of the vehicle 2, which is detected by the steering angle sensor 17. By so doing, the ECU 8 is allowed to increase the upper limit of the right and left braking force difference as the lateral movement of the vehicle 2 increases. Here, one of merits of the braking force distribution control for controlling the braking forces at the right rear wheel 3RR and left rear wheel 3RL such that the slip ratios of the right rear wheel 3RR and left rear wheel 3RL are equal to each other is that it is possible to achieve appropriate distribution of braking forces even when the vehicle 2 is making a turn. By so doing, the vehicle 2 is placed in a state of, for example, [outer wheel braking force>inner wheel braking force], and is prevented from spinning while making a turn. At this time, in the braking force control system 401, because of the upper limit set for the right and left braking force difference in braking force distribution control, when the vehicle 2 brakes while making a turn in which a right and left braking force difference larger than that while the vehicle 2 is travelling straight ahead is required, the right and left braking force difference may reach the upper limit and, as a result, vehicle stability may be suppressed.

In contrast to this, for example, when the vehicle 2 is making a lateral movement at the time of a start of braking, the above-configured braking force control system 401 sets the upper limit of the right and left braking force difference to a larger value as the lateral movement of the vehicle 2 increases. As a result, the braking force control system 401 is able to allow a right and left braking force difference that is required when the vehicle 2 brakes while making a turn and also to minimize instability of the behavior of the vehicle 2 due to an unintended right and left braking force difference while the vehicle 2 is travelling straight ahead.

Fifth Embodiment

Figure 7:
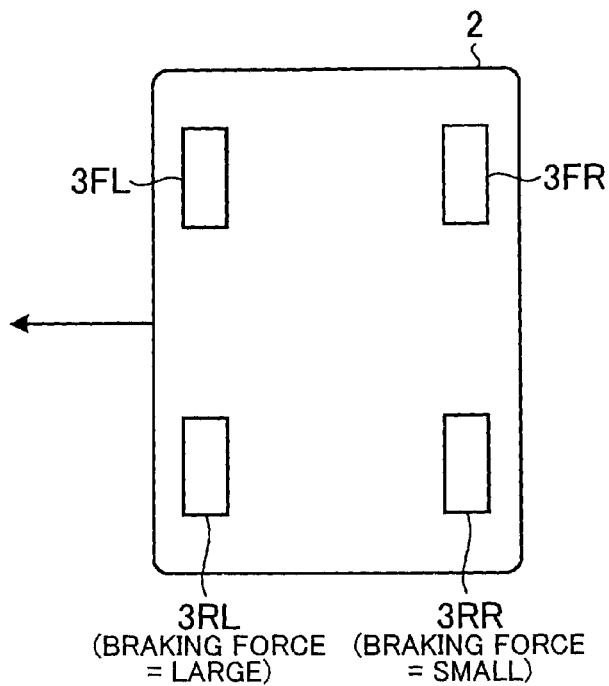
FIG. 7 is a schematic view for illustrating an upper limit that is set by a braking force control system according to a fifth embodiment.
Figure 8:
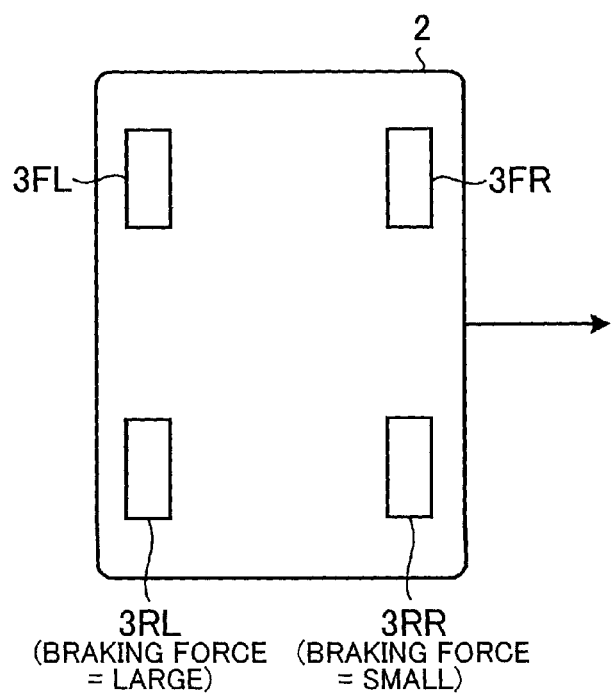
FIG. 8 is a schematic view for illustrating the upper limit that is set by the braking force control system according to the fifth embodiment.

FIG. 7 and FIG. 8 are schematic views for illustrating an upper limit that is set by a braking force control system according to a fifth embodiment. The braking force control system according to the fifth embodiment differs from those of the first to fourth embodiments in a method of setting the upper limit.

The ECU 8 of the braking force control system 501 (see FIG. 1) according to the present embodiment sets the upper limit of the right and left braking force difference on the basis of the magnitude relation in braking force between the right rear wheel 3RR and the left rear wheel 3RL, based on the results detected by the corresponding wheel cylinder pressure sensors 19, and the like.

That is, as shown in FIG. 7, the ECU 8 sets the upper limit of the right and left braking force difference so as to relatively reduce when one of the right rear wheel 3RR and the left rear wheel 3RL, having a larger braking force, (left rear wheel 3RL in the example of FIG. 7) is the wheel at a side toward which the lateral movement of the vehicle 2 is directed. By so doing, when the magnitude relation in braking force between the right rear wheel 3RR and the left rear wheel 3RL is a relation to increase the lateral movement of the vehicle 2, the ECU 8 is allowed to relatively reduce the upper limit of the right and left braking force difference.

On the other hand, as shown in FIG. 8, the ECU 8 sets the upper limit of the right and left braking force difference so as to relatively increase when one of the right rear wheel 3RR and the left rear wheel 3RL, having a larger braking force, (left rear wheel 3RL in the example of FIG. 8) is the wheel at a side opposite to the side toward which the lateral movement of the vehicle 2 is directed. By so doing, when the magnitude relation in braking force between the right rear wheel 3RR and the left rear wheel 3RL is a relation to reduce the lateral movement of the vehicle 2, the ECU 8 is allowed to relatively increase the upper limit of the right and left braking force difference.

Thus, for example, when the vehicle 2 is steered after a start of braking, the above-configured braking force control system 501 is able to set the upper limit of the right and left braking force difference on the basis of the relationship between the direction of the lateral movement of the vehicle 2 through steering operation and the direction of a change in the behavior of the vehicle 2 due to the right and left braking force difference. As a result, the braking force control system 501 is able to sufficiently allow the right and left braking force difference for a side toward which the behavior of the vehicle 2 becomes stable, and is able to reliably suppress the right and left braking force difference for a side toward which the behavior of the vehicle 2 becomes unstable. By so doing, the braking force control system 501 is able to further reliably stabilize the behavior of the vehicle 2 through braking force distribution control even when there is a large change in the behavior of the vehicle 2 after a start of braking, such as even when the vehicle 2 is steered after a start of braking.

Sixth Embodiment

Figure 9:
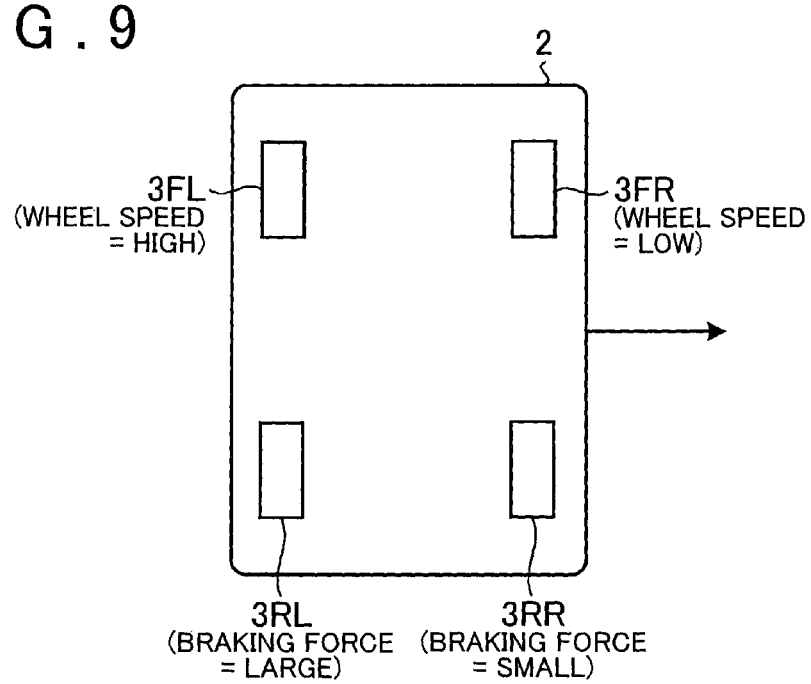
FIG. 9 is a schematic view for illustrating an upper limit that is set by a braking force control system according to a sixth embodiment.
Figure 10:
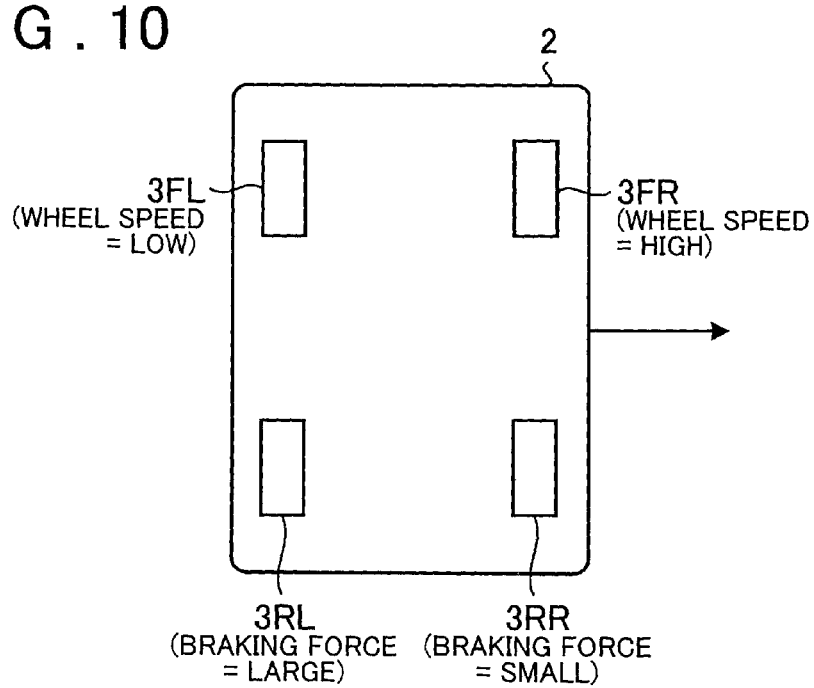
FIG. 10 is a schematic view for illustrating the upper limit that is set by the braking force control system according to the sixth embodiment.

FIG. 9 and FIG. 10 are schematic views for illustrating an upper limit that is set by a braking force control system according to a sixth embodiment. The braking force control system according to the sixth embodiment differs from those of the first to fifth embodiments in a method of setting the upper limit.

The ECU 8 of the braking force control system 601 (see FIG. 1) according to the present embodiment sets the upper limit of the right and left braking force difference on the basis of the magnitude relation in wheel speed between the right front wheel 3FR and the left front wheel 3FL, based on the results detected by the corresponding wheel speed sensors 13, the magnitude relation in braking force between the right rear wheel 3RR and the left rear wheel 3RL, based on the corresponding wheel cylinder pressure sensors 19, and the like.

That is, as shown in FIG. 9, the ECU 8 sets the upper limit of the right and left braking force difference so as to relatively increase when one of the right rear wheel 3RR and, the left rear wheel 3RL, having a larger braking force, (left rear wheel 3RL in the example of FIG. 9) is the wheel at a side at which one of the right front wheel 3FR and the left front wheel 3FL, having a higher wheel speed, is located. By so doing, when the magnitude relation in braking force between the right rear wheel 3RR and the left rear wheel 3RL is a relation to reduce the wheel speed difference between the right front wheel 3FR and the left front wheel 3FL on the assumption that the above magnitude relation in braking force is replaced with the magnitude relation in front wheel-side braking force, the ECU 8 is allowed to relatively increase the upper limit of the right and left braking force difference.

On the other hand, as shown in FIG. 10, when one of the right rear wheel 3RR and the left rear wheel 3RL, having a larger braking force, (left rear wheel 3RL in the example of FIG. 10) is the wheel at a side at which one of the right front wheel 3FR and the left front wheel 3FL, having a lower wheel speed, is located, the ECU 8 sets the upper limit of the right and left braking force difference so as to relatively reduce. By so doing, when the magnitude relation in braking force between the right rear wheel 3RR and the left rear wheel 3RL is a relation to increase the wheel speed difference between the right front wheel 3FR and the left front wheel 3Ft on the assumption that the above magnitude relation in braking force is replaced with the magnitude relation in front wheel-side braking force, the ECU 8 is allowed to relatively reduce the upper limit of the right and left braking force difference.

In order to ensure the directional stability of the vehicle 2, the case where a required right and left braking force difference tends to relatively increase is, for example, a case where a generated deceleration is relatively high, a case where the vehicle 2 is making a turn, a case where a right and left ground contact load difference is large, or the like. The braking force control system 601 distributes braking forces such that [inner wheel braking force<outer wheel braking force] in these cases. This coincides with the direction to reduce the wheel speed difference between the right front wheel 3FR and the left front wheel 3FL [inner wheel speed<outer wheel speed]. However, when the orientation of the body of the vehicle 2 is caused to deflect, for example, when the tire characteristics of the right and left wheels 3 are different or when the vehicle 2 is travelling on a split μ, road, the braking force control system 601 distributes braking forces such that [inner braking force>outer braking force], so it is the direction to increase the wheel speed difference between the right front wheel 3FR and the left front wheel 3FL [inner wheel speed<outer wheel speed].

The braking force control system 601 according to the present embodiment utilizes the above phenomenon, relatively increases the upper limit of the right and left braking force difference when the magnitude relation in braking force between the right rear wheel 3RR and the left rear wheel 3RL is a relation to reduce the wheel speed difference between the right front wheel 3FR and the left front wheel 3FL, and relatively reduces the upper limit when the magnitude relation is a relation to increase the wheel speed difference between the right front wheel 3FR and the left front wheel 3FL. As a result, the braking force control system 601 is able to set a proper upper limit of the right and left braking force difference with a further simple configuration, and is able to reliably stabilize the behavior of the vehicle 2 through braking force distribution control with a further simple configuration.

Note that the above described braking force control systems according to the aspect of the invention are not limited to the configurations described in the above embodiments; various modifications are possible within the scope of the appended claims. The braking force control system according to the aspect of the invention may be implemented by appropriately combining the components of the above-described embodiments.

In the above description, the controller of the braking force control system is implemented as the ECU that controls the various components of the vehicle; however, it is not limited to this configuration. For example, the controller of the braking force control system may be configured separately from the ECU and may be configured to exchange detected signals, driving signals, and information, such as control commands, with the ECU.

In the above description, the controller uses a difference in braking force between right and left wheels as a right and left braking force deviation; however, the controller is not limited to this configuration. For example, the controller may use a ratio of braking force between the right and left wheels (for example, the braking force of one-side wheel/the braking force of the other-side wheel), or the like.

The invention claimed is:

1. A braking force control system comprising:
a braking device that individually adjusts braking forces that are respectively generated at wheels of a vehicle; and
a controller that executes braking force distribution control for individually controlling the braking forces at right and left wheels such that slip conditions of the right and left wheels of the vehicle are equal to each other through control of the braking device, wherein
the controller executes the braking force distribution control on the basis of an upper limit of a right and left braking force deviation that is a deviation in braking force between the right and left wheels, and wherein
the upper limit relatively reduces when one of the right and left wheels, including a larger braking force, is a wheel at a side toward which a lateral movement of the vehicle is directed, and relatively increases when one of the right and left wheels, including a larger braking force, is a wheel at a side opposite to the side toward which the lateral movement of the vehicle is directed.

2. The braking force control system according to claim 1, wherein
the upper limit increases as an absolute value of a deceleration of the vehicle increases.

3. The braking force control system according to claim 1, wherein
the upper limit increases as an absolute value of a deceleration of the vehicle reduces.

4. The braking force control system according to claim 1, wherein
the upper limit reduces as a travel speed of the vehicle increases.

5. The braking force control system according to claim 1, wherein
the upper limit increases as a lateral movement of the vehicle increases.

6. The braking force control system according to claim 1, wherein
in the braking force distribution control, when the right and left braking force deviation is larger than the upper limit, the controller prohibits an increase in the braking force at an outer wheel side between the right and left wheels while an orientation of the vehicle is deflecting or while the vehicle is making a turn.

7. A braking force control system comprising:
a braking device that individually adjusts braking forces that are respectively generated at wheels of a vehicle; and
a controller that executes braking force distribution control for individually controlling the braking forces at right and left wheels such that slip conditions of the right and left wheels of the vehicle are equal to each other through control of the braking device, wherein
the controller executes the braking force distribution control on the basis of an upper limit of a right and left braking force deviation that is a deviation in braking force between the right and left wheels, and wherein
the upper limit relatively increases when one of the right and left rear wheels of the vehicle, including a larger braking force, is a wheel at a side at which one of the right and left front wheels of the vehicle, including a higher wheel speed, is located, and relatively reduces when one of the right and left rear wheels of the vehicle, including a larger braking force, is a wheel at a side at which one of the right and left front wheels of the vehicle, including a lower wheel speed, is located.

8. The braking force control system according to claim 7, wherein
the upper limit increases as an absolute value of a deceleration of the vehicle increases.

9. The braking force control system according to claim 7, wherein
the upper limit increases as an absolute value of a deceleration of the vehicle reduces.

10. The braking force control system according to claim 7, wherein
the upper limit reduces as a travel speed of the vehicle increases.

11. The braking force control system according to claim 7, wherein
the upper limit increases as a lateral movement of the vehicle increases.

12. The braking force control system according to claim 7, wherein
in the braking force distribution control, when the right and left braking force deviation is larger than the upper limit, the controller prohibits an increase in the braking force at an outer wheel side between the right and left wheels while an orientation of the vehicle is deflecting or while the vehicle is making a turn.

13. A braking force control method for a vehicle that includes a braking device that individually adjusts braking forces that are respectively generated at wheels of a vehicle, comprising:

executing braking force distribution control for individually controlling the braking forces at right and left wheels such that slip conditions of the right and left wheels of the vehicle are equal to each other through control of the braking device, wherein the braking force distribution control is executed on the basis of an upper limit of a right and left braking force deviation that is a deviation in braking force between the right and left wheels, and wherein the upper limit relatively reduces when one of the right and left wheels, including a larger braking force, is a wheel at a side toward which a lateral movement of the vehicle is directed, and relatively increases when one of the right and left wheels, including a larger braking force, is a wheel at a side opposite to the side toward which the lateral movement of the vehicle is directed.

14. The braking force control method according to claim 13, wherein
the upper limit increases as an absolute value of a deceleration of the vehicle increases.

15. The braking force control method according to claim 13, wherein
the upper limit increases as an absolute value of a deceleration of the vehicle reduces.

16. The braking force control method according to claim 13, wherein
the upper limit reduces as a travel speed of the vehicle increases.

17. The braking force control method according to claim 13, wherein
the upper limit increases as a lateral movement of the vehicle increases.

18. The braking force control method according to claim 13, wherein
in the braking force distribution control, when the right and left braking force deviation is larger than the upper limit, an increase in the braking force at an outer wheel side between the right and left wheels is prohibited while an orientation of the vehicle is deflecting or while the vehicle is making a turn.

19. A braking force control method for a vehicle that includes a braking device that individually adjusts braking forces that are respectively generated at wheels of a vehicle, comprising:

executing braking force distribution control for individually controlling the braking forces at right and left wheels such that slip conditions of the right and left wheels of the vehicle are equal to each other through control of the braking device, wherein the braking force distribution control is executed on the basis of an upper limit of a right and left braking force deviation that is a deviation in braking force between the right and left wheels, and wherein the upper limit relatively increases when one of the right and left rear wheels of the vehicle, including a larger braking force, is a wheel at a side at which one of the right and left front wheels of the vehicle, including a higher wheel speed, is located, and relatively reduces when one of the right and left rear wheels of the vehicle, including a larger braking force, is a wheel at a side at which one of the right and left front wheels of the vehicle, including a lower wheel speed, is located.

20. The braking force control method according to claim 19, wherein
the upper limit increases as an absolute value of a deceleration of the vehicle increases.

21. The braking force control method according to claim 19, wherein
the upper limit increases as an absolute value of a deceleration of the vehicle reduces.

22. The braking force control method according to claim 19, wherein
the upper limit reduces as a travel speed of the vehicle increases.

23. The braking force control method according to claim 19, wherein
the upper limit increases as a lateral movement of the vehicle increases.

24. The braking force control method according to claim 19, wherein
in the braking force distribution control, when the right and left braking force deviation is larger than the upper limit, an increase in the braking force at an outer wheel side between the right and left wheels is prohibited while an orientation of the vehicle is deflecting or while the vehicle is making a turn.

* * * * *